United States Patent [19]
Sofie et al.

[11] Patent Number: 5,660,916
[45] Date of Patent: Aug. 26, 1997

[54] METHOD FOR ADHERING A FLEXIBLE SHEET TO A SEMI-RIGID THERMOPLASTIC RESINOUS SHEET AND PRODUCTS RELATING THERETO

[75] Inventors: Michael P. Sofie; John A. Barrett, both of Seattle, Wash.

[73] Assignee: Barrett Enclosures, Inc., Seattle, Wash.

[21] Appl. No.: 520,929

[22] Filed: Aug. 30, 1995

Related U.S. Application Data

[63] Continuation-in-part of Ser. No. 176,032, Dec. 30, 1993, Pat. No. 5,472,771.

[51] Int. Cl.$^6$ .............................. B32B 23/02; B63B 19/12
[52] U.S. Cl. .............................. 428/192; 428/52; 428/198; 114/201 R; 114/361; 114/343
[58] Field of Search ............................... 114/201 R, 361, 114/343; 428/192, 198, 52

[56] References Cited

U.S. PATENT DOCUMENTS

| | | | |
|---|---|---|---|
| 3,241,877 | 3/1966 | Tate . | |
| 3,604,440 | 9/1971 | Wilson | 135/6 |
| 3,663,333 | 5/1972 | Palfreyman | 156/256 |
| 3,843,982 | 10/1974 | Lane et al. | 114/361 |
| 4,466,374 | 8/1984 | Katz | 114/71 |
| 4,668,324 | 5/1987 | Burns | 156/247 |
| 5,027,739 | 7/1991 | Lackovic | 114/361 |
| 5,061,332 | 10/1991 | Stolz et al. | 156/94 |
| 5,121,703 | 6/1992 | Smith | 114/361 |

Primary Examiner—Patrick Ryan
Assistant Examiner—Cathy F. Lam
Attorney, Agent, or Firm—Seed and Berry LLP

[57] ABSTRACT

There is disclosed a method for adhering a flexible sheet (such as a fibrous or resinous sheet) to a semi-rigid thermoplastic resinous sheet (such as a polycarbonate or acrylic sheet). In one embodiment, the method comprises the steps of contacting an edge surface of a flexible fibrous sheet with a thermosetting resin and allowing the resin to cure to yield a unified surface, applying an adhesive along of an edge surface of the semi-rigid sheet to yield an adhesive surface and contacting the unified surface of the flexible fibrous sheet with the adhesive surface of the semi-rigid sheet to adhere the flexible fibrous sheet to the semi-rigid sheet. The products made by this method are suitable for a variety of applications, including use as boat and dwelling enclosures.

4 Claims, 3 Drawing Sheets

METHOD FOR ADHERING A FLEXIBLE SHEET TO A SEMI-RIGID THERMOPLASTIC RESINOUS SHEET AND PRODUCTS RELATING THERETO

CROSS-REFERENCE TO RELATED APPLICATIONS

This application claims priority from co-pending International application No. PCT/US94/14986, filed Dec. 29, 1994, and is a continuation-in-part of U.S. patent application Ser. No. 08/176,032, filed Dec.30, 1993 U.S. Pat. No. 5,472,771.

TECHNICAL FIELD

This invention relates generally to a method for adhering a flexible sheet to a semi-rigid thermoplastic resinous sheet and, more specifically, to a method for adhering canvas to a polycarbonate or acrylic sheet.

BACKGROUND OF THE INVENTION

Canvas and other like fabrics are often used to provide protection against the elements. For many products, these are the materials of choice for two reasons: first, they are effective in providing a shield from the natural elements including wind, rain, snow and sun; and secondly, by virtue of the soft, resilient nature of these materials, they are flexible and compactible which allows for their convenient retraction and storage. Tents and awnings, for example, have historically been manufactured from canvas because of the protection it provides, and because such canvas products may be readily folded and stored when not in use.

Vehicle covers have also been fabricated from canvas-like materials for many of the same reasons. Folding tops for automobiles provide the benefits that a convertible automobile affords. However, during periods of cool or inclement weather, the driver is fully protected by the automobile's convertible roof in its engaged position. Boaters may enjoy similar protection provided by analogous covers. In addition to protection against sun, wind and rain, boaters may also rely on these covers for protection of the vessel's occupants and interior against sea water during stormy or high sea conditions. For safety reasons, in addition to providing protection against the elements, vehicle and boat covers must also provide visibility to the operator. Typically, transparent sections are incorporated into automobile convertible tops (e.g., rear windows), as well as boat enclosures (such as a sailboat storm dodger). These windows also provide viewing for passengers within the vehicle or boat.

Windows are typically made from glass. However, because glass is inflexible and unable to absorb shock, its utility as a window material in a flexible, compactible protective enclosure is greatly diminished. Alternatives to glass primarily include flexible, resinous materials (i.e., plastics). Clear vinyl is one such plastic which has been widely used as transparent sections or windows in these applications. Despite its widespread application, vinyl does not share the ideal transparency properties of glass. Over time and use, wrinkles form in the vinyl which reduce its visibility. Vinyl transparency is further diminished by the difficulty associated with its cleaning. In addition, vinyl sections are susceptible to changes in size and shape as a result of heating and cooling cycles which are commonly encountered in normal use of these materials as windows.

Perhaps the most durable plastics which maintain high visibility are semi-rigid Plexiglas-type materials. These materials are characterized by high transparency, ease of cleaning, and high shock resistance. Typical of this type of material are polycarbonate and acrylic-based thermoplastic sheets.

The primary difficulty in manufacturing a suitable protective cover with a transparent section lies in the formation of a suitable adherence or bond between the flexible protective material (e.g., the canvas) and the semi-rigid transparent section (e.g., the Plexiglas). This difficulty results from the difference in the nature of the two materials. Canvas and other like fabrics are woven or otherwise composed of fibers, and possess a porous, rough and non-uniform surface. On the other hand, typical transparent sections are resinous materials with a relatively smooth and uniform surface.

Previous methods of joining such divergent materials include mechanical techniques, such as securing a transparent section in a fabric frame and attaching the frame to the body of the covering through the use of pins (U.S. Pat. No. 3,241,877). Attempts have also been made to secure transparent sections in rigid frames (U.S. Pat. No. 5,121,703). Alternatively, vinyl transparent sections have often been sewn to the flexible portion of the covering (U.S. Pat. No. 5,027,739). In these instances, the interface between the flexible protective sheet and the transparent section is troublesome. Merely securing the window in a fabric provides no seal against the natural elements. Moreover, the seam which results from sewing the two materials is susceptible to both leakage and eventual breakdown and tearing.

Accordingly, there is a need in the art for a method for adhering canvas and like fabrics to semi-rigid transparent materials to provide flexible, protective coverings with high transparency. Furthermore, such a method should provide a durable bond between the two materials without the disadvantages associated with existing mechanical attachment techniques. The present invention fulfills these needs, and provides further related advantages.

SUMMARY OF THE INVENTION

Briefly stated, the present invention is directed to a method for adhering a flexible sheet to a semi-rigid thermoplastic resinous sheet. In one embodiment, the flexible sheet is a flexible fibrous sheet and, in another embodiment, the flexible sheet is a flexible resinous sheet.

As mentioned above, in one embodiment, the present invention is directed to a method for adhering a flexible fibrous sheet to a semi-rigid thermoplastic resinous sheet by contacting at least a portion of an edge surface of the flexible fibrous sheet with a thermosetting resin and allowing the resin to cure to yield a unified surface, applying an adhesive along at least a portion of an edge surface of the semi-rigid thermoplastic resinous sheet to yield an adhesive surface, and contacting the unified surface with the adhesive surface for a period of time and under appropriate pressure to adhere the unified surface to the adhesive surface. In a preferred embodiment, the flexible fibrous sheet is a canvas material and the semi-rigid thermoplastic resinous sheet is a polycarbonate or acrylic sheet.

In another embodiment, the present invention is directed to a method for adhering a flexible resinous sheet to a semi-rigid thermoplastic resinous sheet by applying an adhesive along at least a portion of an edge surface of a semi-rigid thermoplastic resinous sheet to yield an adhesive surface, and contacting a portion of the edge surface of the flexible resinous sheet with the adhesive surface for a period of time and under appropriate pressure to adhere the flexible resinous sheet to the adhesive surface. In a preferred embodiment, the flexible resinous sheet is a vinyl resinous sheet and the semi-rigid thermoplastic resinous sheet is a polycarbonate or acrylic sheet.

In further embodiments of the present invention, products made by the above methods are disclosed. These products comprise a semi-rigid thermoplastic resinous sheet having either a flexible fibrous sheet or flexible resinous sheet border affixed to at least a portion of the edge surface thereof. Such products are useful in numerous applications, including (but not limited to) use as coverings for marine vessels and automotive vehicles, as well as awnings for decks, porches, and restaurant additions.

Other aspects of the present invention will become evident upon reference to the attached figures and following detailed description.

DETAILED DESCRIPTION OF THE INVENTION

Figure 1A:
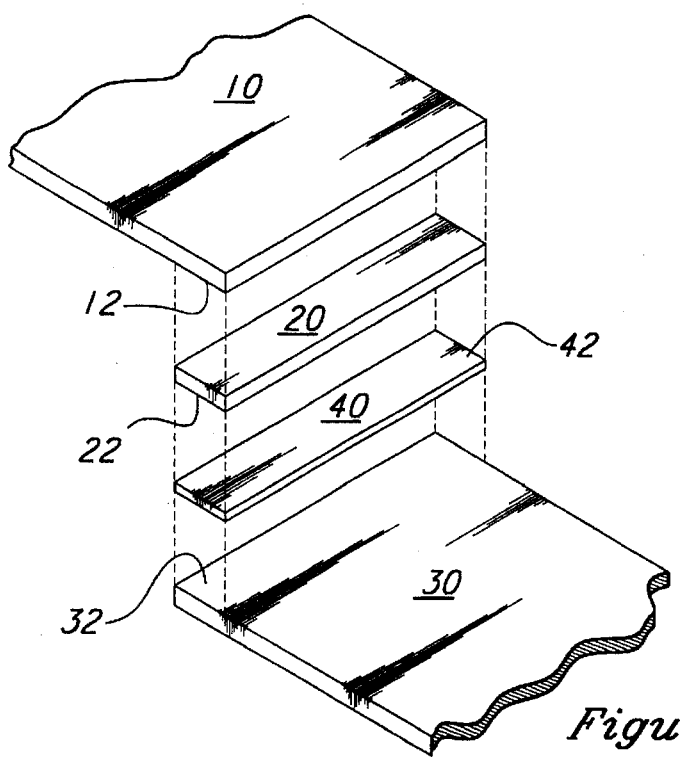
FIG. 1 illustrates a method for adhering a flexible fibrous sheet to a semi-rigid thermoplastic resinous sheet in an exploded perspective view, FIG. 1A, and in an assembled perspective view, FIG. 1B.
Figure 1B:
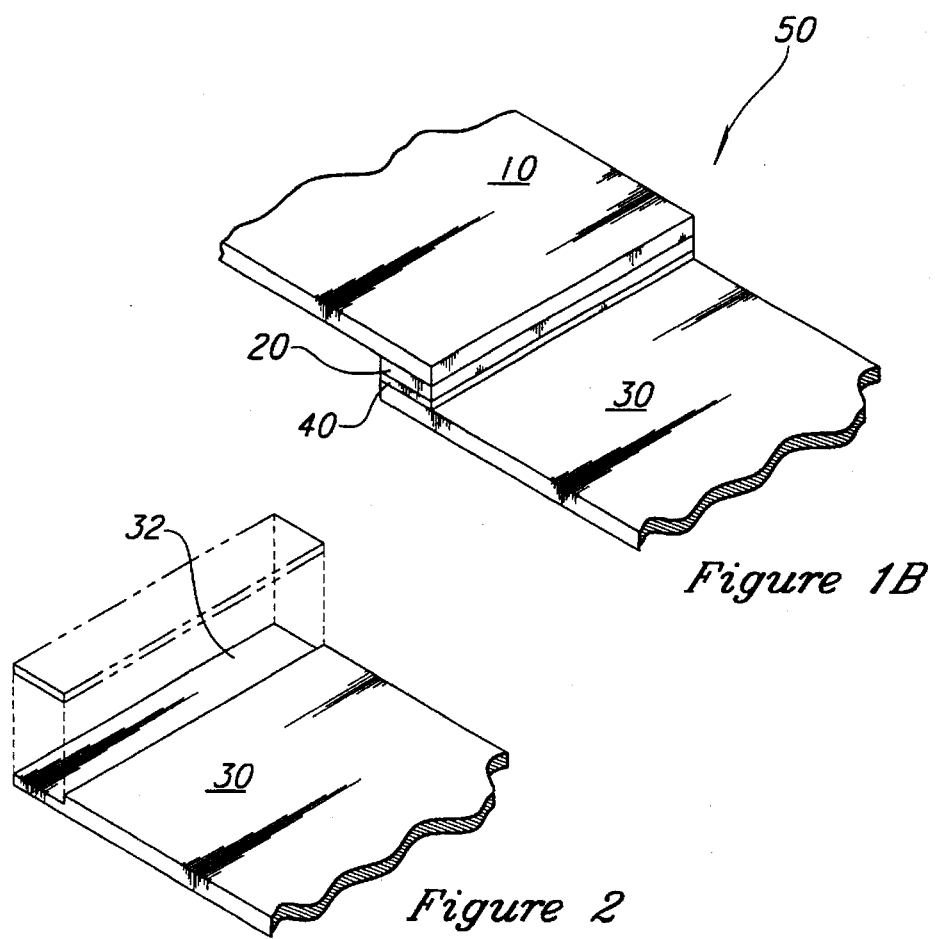

As indicated above, the present invention is directed to a method for adhering a flexible sheet to a semi-rigid thermoplastic resinous sheet, and to products formed therefrom. In one embodiment, the flexible sheet is a flexible fibrous sheet, and in another embodiment the flexible sheet is a flexible resinous sheet. Referring to FIGS. 1A and 1B, and in one embodiment, the method of this invention comprises the steps of contacting a portion of an edge surface 12 of a flexible fibrous sheet 10 with a thermosetting resin 20 and allowing the resin to cure to provide a unified surface 22; applying to a portion of an edge surface 32 of a semi-rigid thermoplastic resinous sheet 30 an adhesive 40 to yield an adhesive surface 42; and contacting the unified surface 22 with the adhesive surface 42 for a period of time and under sufficient conditions (e.g., temperature and pressure) to adhere the unified surface to the adhesive surface, thus yielding product 50. It should be noted that the relative thickness of the individual components identified in FIG. 1 are not drawn to scale. Rather, the thickness of some components (such as the thermosetting resin 20) has been exaggerated to aid in the illustration thereof. In addition, due to the porous nature of the flexible fibrous sheet, the thermosetting resin 20 will penetrate the edge surface 12 of the flexible fibrous sheet 10.

Figure 2:
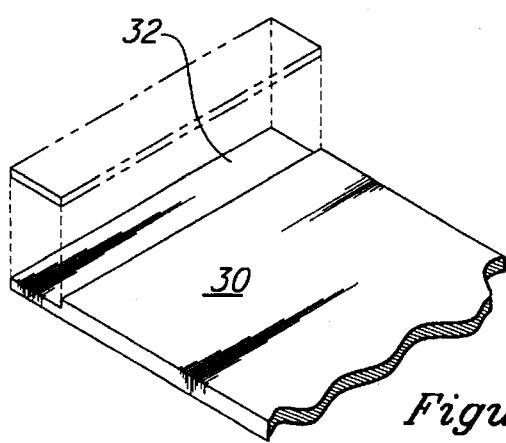
FIG. 2 illustrates an abraded edge surface of the semi-rigid thermoplastic resinous sheet.

In a preferred embodiment of this invention, the edge surface of the semi-rigid thermoplastic resinous sheet is abraded prior to applying the adhesive to the edge surface of the sheet. As illustrated in FIG. 2, edge surface 32 of the semi-rigid thermoplastic resinous sheet 30 is abraded by removal of a portion of the edge surface to a given depth. The abrasion of the resinous sheet effectively removes the glazed surface of the sheet, and creates a surface which is more suitable for bonding by the adhesive.

Figure 3:
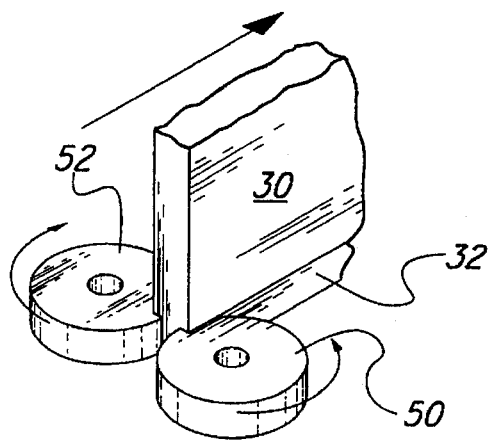
FIG. 3 illustrates the process of abrading the front and back edge surfaces of the semi-rigid thermoplastic resinous sheet.

In a preferred embodiment (as illustrated in FIG. 3), a portion of both the front and back edge surface 32 of the semi-rigid thermoplastic resinous sheet 30 is removed by counter-rotating grinding wheels 50 and 52. Preferably, the grinding wheels are about one inch in height, thus abrading the edge surface of the semi-rigid thermoplastic resinous sheet a distance extending one inch inwards from the edge of the resinous sheet. The depth of the abrading is controlled by the distance between the counter-rotating wheels, and is generally set to remove about $\frac{1}{32}$ of an inch from both sides of the resinous sheet. Abrading the edge surface to this depth removes the glazed surface of the semi-rigid thermoplastic resinous sheet, but does not significantly weaken the sheet. The depth of the abraded edge may vary, however, depending on the thickness of the semi-rigid thermoplastic resinous sheet. Similarly, the height of the grinding wheels, and thus the width of the abraded edge, may vary depending upon the desired surface area of contact between the unified surface of the flexible fibrous sheet and the adhesive surface of the semi-rigid thermoplastic resinous sheet.

To protect against scratching, semi-rigid thermoplastic resinous sheets typically are sold with a protective covering removably affixed to both their front and back surfaces. Preferably, this protective covering is removed from the edge surface prior to abrading. The remaining portion of the protective covering should remain on the semi-rigid sheet until installation of the completed product.

Figure 4A:
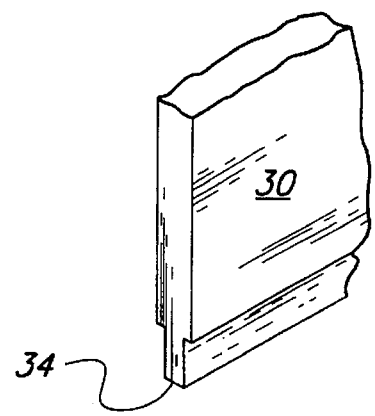
FIG. 4 illustrates the semi-rigid thermoplastic resinous sheet after abrading, FIG. 4A, and after smoothing the end of the abraded sheet, FIG. 4B.
Figure 4B:
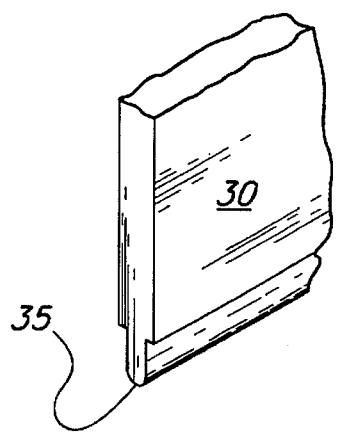

To prevent cracking of the abraded semi-rigid sheet, abraded end 34 of the semi-rigid thermoplastic resinous sheet 30 (see FIG. 4A) is smoothed by, for example, routing or filing. Such a smoothed abraded end 35 is illustrated in FIG. 4B. Preferably, smoothing is accomplished by passing abraded end 34 over a bullnose router bit.

The flexible fibrous sheet of this invention may be any suitable resilient and woven material. Preferred flexible fibrous sheets are canvases which may be made from a number of closely woven fabrics, including hemp, flax, jute and cotton. Alternatively, the flexible fibrous sheet may be made from a blend of fabrics. Suitable flexible fibrous sheets include the following commercially available products: Sunbrella, 9.5 oz. (Glen Raven Mills); Furniture Fabrics, 8.0 oz. (Glen Raven Mills); Firesist, 9.25 oz. (Dickson Constant); Cordura 1000, 11 oz. (DuPont); Cordura 4004 6/6, 6.2 oz. (DuPont); Cordura 420 6/6, 6.8 oz. (DuPont); Top Gun, 11 oz. (DuPont); Anso-Tex, 10.4 oz. (Allied Signal); Surf Craft Fabrics, 12 oz. (Doran Mills); and Weather Proof Fabric, 12+ oz. (Doran Mills). In general, such flexible fibrous sheets have a cloth weight ranging from 5 to 15 oz., preferably ranging from 6 to 12 oz., and more preferably from 9 to 10 oz. In a most preferred embodiment, the flexible fibrous sheet is Sunbrella 9.5 oz. (Glen Raven Mills, Glen Raven, N.C.). In addition to the companies identified above, other manufacturers of suitable fibrous sheets of this invention include: Dick Elberton Company, Duran Textiles, Master Craft, Twichell Company, and Wellenton Sears.

The semi-rigid thermoplastic resinous sheet of this invention may be any suitable transparent or semi-transparent sheet which provides both protection and visibility, including resinous sheets derived from thermoplastic resins. Thermoplastic resinous sheets are those characterized by retention of their basic qualities despite repeated heating and softening. Suitable semi-rigid thermoplastic resinous sheets may be derived from acrylonitrile-butadiene-styrene (ABS), acrylic, nylon, polycarbonate, polyethylene, polypropylene, polystyrene, and vinyl resins. Preferred thermoplastic resinous sheets are polycarbonate, acrylic, and vinyl resinous sheets. Suitable semi-rigid thermoplastic resinous sheets of this invention include the following Lexan sheet products (i.e., polycarbonates) manufactured by General Electric Plastics (Pittsfield, Mass.): XL, 0.093–½ inch; Protecta Glaze, ⅛–½ inch; Thermo Clear (twin wall sheet), 6–16 mm; MR5, ⅛–½ inch; and Lexan Film, various gauges from 0.007–0.030 inch. Further suitable products are manufactured by the Rohm & Hass Company (Philadelphia, Pa.) and include: Tuffak A, film–½ inch (polycarbonate); Tuffak CM-2, film–½ inch (polycarbonate); Tuffak XL, film–½ inch (polycarbonate); Implex, 0.093–0.354 inch (modified acrylic); Plexiglass, various gauges (acrylic); Lucite, various gauges (acrylic); Acralite, various gauges (acrylic); Perspects, various gauges (acrylic); and Modified Acrylics, various gauges (acrylic). In general, such semi-rigid thermoplastic resinous sheets may range in thickness from thin films up to ½ inch sheets, and preferably range from 1/16–¼ inches in thickness. In a most preferred embodiment, the semi-rigid thermoplastic resinous sheet is the polycarbonate sheet Lexan XL sold by General Electric Plastics (Pittsfield, Mass.).

If the semi-rigid thermoplastic resinous sheet is utilized to provide visibility, the semi-rigid thermoplastic resinous sheet should be substantially transparent, and in a preferred embodiment is colorless. Alternatively, to provide protection against direct sunlight, the semi-rigid thermoplastic resinous sheet may be tinted. In addition, a mirrored semi-rigid thermoplastic resinous sheet may be preferred in some applications. For example, in a golf driving range setting, the driving stalls may be separated by a mirrored semi-rigid thermoplastic sheet held within a flexible sheet. Such a product serves to isolate one golfer from another and, by viewing his reflection in the mirrored sheet, further allows the golfer to observe his golfing stance and/or golf club grip.

As indicated above, a unified surface is prepared along at least a portion of an edge surface of the flexible fibrous sheet. As used herein, a "unified surface" refers to a resinous surface derived from a thermosetting resin, and serves to provide a uniform, smooth and integrated surface. The uniform and smooth surface is necessary to achieve adhesion with the adhesive surface of the semi-rigid thermoplastic resinous sheet. The unified surface is required because of the woven nature of the surface of the flexible fibrous sheet which is irregular and rough. Such a surface alone is unsuitable for adhering a flexible fibrous sheet to a semi-rigid thermoplastic resinous sheet. The unified surface is also integrated with the fibrous sheet to provide strong adhesion between the unified surface and the flexible fibrous sheet which, in turn, creates strong adhesion between the flexible fibrous sheet and the semi-rigid thermoplastic resinous sheet.

The unified surface is prepared by application of a thermosetting resin to at least a portion of the edge surface of the flexible fibrous sheet. Thermosetting resins are resins which, once set at a temperature critical to the resin, cannot be resoftened or reworked. Suitable thermosetting resins include alkyd, epoxy, phenolic, polyester, silicone, and urethane resins. Preferred thermosetting resins are epoxy resins. In a most preferred embodiment, the epoxy resin is DP 100 (3M, St. Paul, Minn.).

With regard to the semi-rigid thermoplastic resinous sheet, the adhesive surface is prepared by applying a suitable adhesive along at least a portion of the edge surface of the semi-rigid thermoplastic resinous sheet. As mentioned above in a preferred embodiment, the edge surface may be abraded prior to application of the adhesive. Suitable adhesives include glues, pastes, cements, gums, resins and tapes. In a preferred embodiment, the adhesive is a double-sided acrylic, urethane, polyethylene or vinyl foam adhesive tape, and in a particularly preferred embodiment is a double-sided adhesive acrylic foam tape. Such acrylic foam tapes are commercially available and include very high bond (VHB) tapes such as VHB 4929, VHB 4949, and VHB 4951 (3M, St. Paul, Minn.). Preferably, the adhesive is the double coated foam tape VHB 4949 having a thickness of 0.045 inches.

An important feature of the present invention is the ability to adhere the flexible sheet to the semi-rigid thermoplastic resinous sheet via a flexible bond. For example, when the adhesive is a double-sided foam tape, the bond between the flexible fibrous sheet and the semi-rigid thermoplastic resinous sheet is capable of slight movement. Such movement minimizes stress to the semi-rigid sheet, as well as to the bond between the adhesive surface and unified surface. In contrast, a rigid bond would be relatively brittle, and would not effectively distribute stress to shelter the unified surface/adhesive surface interface. In other words, the unified surface/adhesive surface bond allows the semi-rigid thermoplastic resinous sheet to "float" at all points in contact with the flexible fibrous sheet. Thus, any materials which result in a unified surface and an adhesive surface which, when contacted, yields a strong, flexible bond between the flexible fibrous sheet and the semi-rigid thermoplastic resinous sheet may be used in the practice of this invention.

In one embodiment, the products of the present invention are prepared by contacting the unified surface of the flexible fibrous sheet with the adhesive surface of the semi-rigid thermoplastic resinous sheet. The first step in the production process involves cutting a semi-rigid thermoplastic resinous sheet to size. The size of the semi-rigid sheet will depend upon the size of the window desired in the final product. After the semi-rigid sheet has been cut to size, the perimeter or end of the semi-rigid sheet is smoothed either by routing or filing. The adhesive surface is then prepared by directly applying an adhesive to the edge surface of the semi-rigid sheet. Typically, the adhesive surface has a dimension of one inch by the length of the resinous sheet. However, this dimension may vary depending primarily on the thickness (and thus the width) of the semi-rigid thermoplastic resinous sheet.

Alternatively, the front and/or back edge surface of the semi-rigid thermoplastic resinous sheet is abraded to provide a surface upon which to apply the adhesive. Typically the abrasion is about one inch (1") wide and about one thirty-second of an inch (1/32") deep. Once abraded, an adhesive, such as a double-sided adhesive acrylic foam tape, is applied to the abraded edge surface in preparation for adhesion to the flexible fibrous sheet. In a preferred embodiment, the semi-rigid thermoplastic resinous sheet is abraded along the perimeter of both its front and back edge surfaces and the adhesive is applied to both of these abraded edge surfaces. As mentioned above, the width of the abrasion may vary depending upon the application, weight of the semi-rigid sheet and strength of bond desired.

The flexible fibrous sheet is preferably prepared for adhesion to the semi-rigid sheet by first sizing the opening or window in the flexible fibrous sheet within which the semi-rigid sheet will be adhered. Once the size of the window has been determined, that area is cut out of the flexible fibrous sheet. The cut is made in the flexible fibrous sheet such that the window cut out is smaller than the semi-rigid sheet (i.e., the flexible fibrous sheet will completely overlap the abraded edge surface of the semi-rigid sheet). The flexible fibrous sheet is preferably cut with a hot knife which seals the cut and prevents the cut edge from unraveling. A thermosetting resin is then applied to the portion of the flexible fibrous sheet that will overlap the adhesive surface applied to the semi-rigid sheet. (Alternatively, the thermosetting resin may be applied to the flexible fibrous sheet prior to cutting out the window opening.) The thermosetting resin is allowed to cure to provide the unified surface. The time required for curing of the thermosetting resin will vary depending upon the resin used.

A representative product of the present invention is assembled by contacting the adhesive surface of the semi-rigid sheet with the unified surface of the flexible fibrous sheet. Adhesion of the flexible fibrous sheet to the semi-rigid sheet is achieved by applying pressure to the overlapping portion of the two sheets sufficient to establish uniform contact between the adhesive surface and the unified surface. Maximum adhesion is achieved essentially upon contact and slight pressure.

Figure 5:
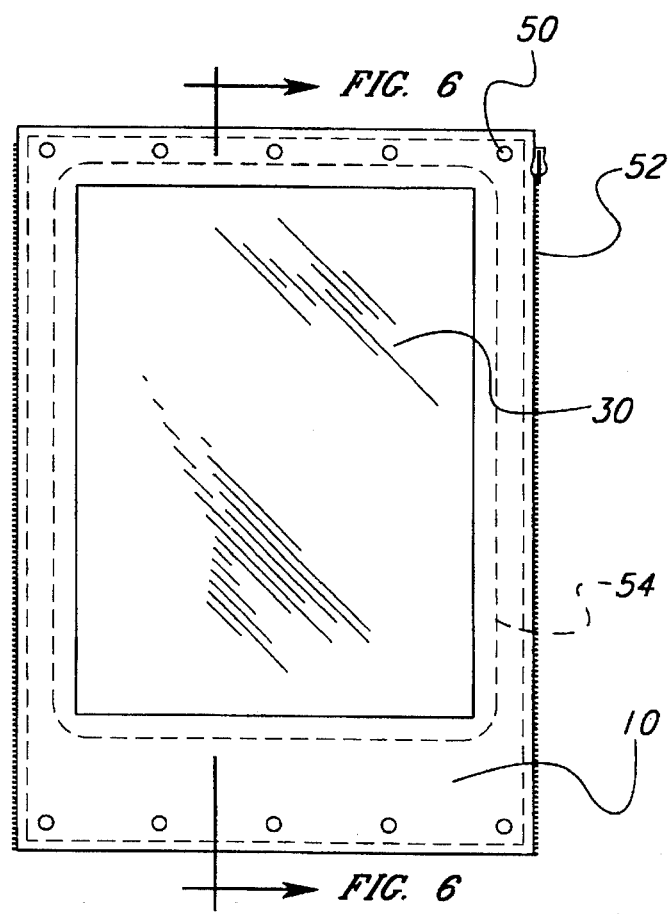
FIG. 5 illustrates a representative product of this invention.
Figure 6:
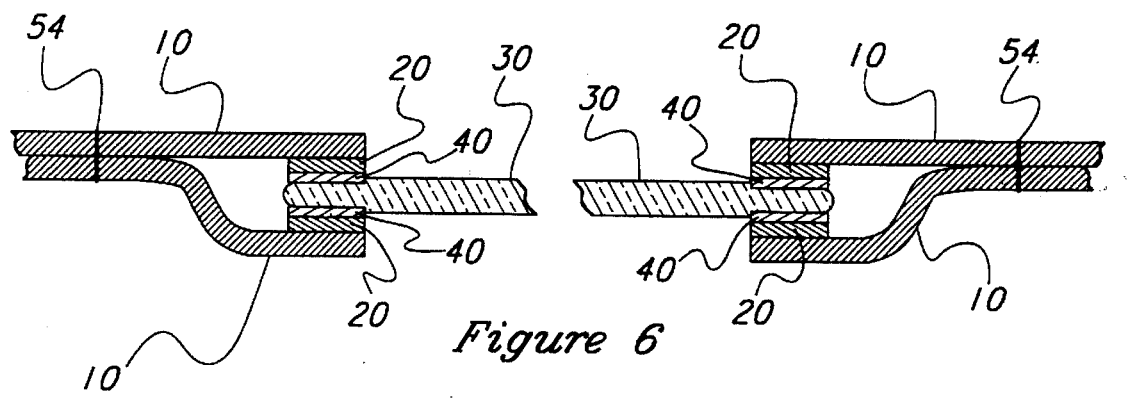
FIG. 6 presents a cross-sectional view of the product of FIG. 5.

In an embodiment where the semi-rigid thermoplastic resinous sheet is abraded on both its front and back edge surfaces, a second flexible fibrous sheet is prepared as described above, and the semi-rigid sheet is "sandwiched" between the two flexible fibrous sheets. Assembly of this embodiment requires contacting the adhesive surfaces of the semi-rigid sheet with the unified surfaces of both of the flexible fibrous sheets. Such an embodiment is illustrated in FIGS. 5 and 6.

In another embodiment of the present invention, a method for adhering a flexible resinous sheet to a semi-rigid thermoplastic sheet is disclosed. Suitable flexible resinous sheets include vinyl resinous sheets. Suitable vinyl resinous sheets include Architent, Cooley-Brite: Back-Lit Awning Fabric, Duracote, Herculite, Patio 500, Premier: Back-Lit Awning Fabric, Snyder, Stamoid (manufactured by Forbo, Inc.), Reflections: Back-Lit Awning Fabric, and Weblon. Preferred vinyl resinous sheets include Duracote, Herculite, and Stamoid. Preferred weights of these vinyl resinous sheets include Duracote (16 ounces per square yard), Herculite (10 ounces per square yard), and Stamoid (7.5 ounces per square yard).

In the practice of the method of the invention, a flexible resinous sheet is adhered to a semi-rigid thermoplastic resinous sheet by applying an adhesive along at least a portion of an edge surface of the semi-rigid thermoplastic resinous sheet to yield an adhesive surface, and contacting a portion of the edge surface of the flexible resinous sheet with the adhesive surface for a period of time and under appropriate pressure to adhere the flexible resinous surface to the adhesive surface. As described above, the semi-rigid thermoplastic sheet may be abraded.

Alternatively, the adhesive may be applied to the edge surface of the flexible resinous sheet to yield an adhesive surface on the flexible resinous sheet. In this method, the semi-rigid thermoplastic sheet is adhered to the flexible resinous sheet by contacting the adhesive surface of the flexible sheet to the semi-rigid resinous sheet.

In a preferred embodiment, the flexible resinous sheet is washed with a suitable solvent prior to contact with the adhesive surface or application of the adhesive. Suitable solvents include solvents which remove surface oils from the resinous sheet and create an edge surface which will have enhanced adherence to the adhesive surface of the semi-rigid sheet or the adhesive applied to the sheet's edge surface. Suitable solvents include polar organic solvents such as acetone, methyl ethyl ketone, ethanol, isopropanol, and mixtures thereof. Preferably, the solvent is acetone.

For flexible vinyl resinous sheets, the adhesive is preferably a double-sided adhesive tape. Suitable adhesive tapes include acrylic tapes which are formulated to withstand a wide range of weather and temperature conditions without losing adhesion. Preferred acrylic tapes include very high bond acrylic foam tapes such as VHB-4900 tapes (3M, St. Paul, Minn.), and pressure sensitive (PS) tapes such as PS-4100 and PS-4400 acrylic bonding tapes (Adco Products, Inc., Michigan Center, Mich.). Preferred VHB 4900 tapes include VHB 4945 which has a tape thickness of 0.045 inches, and preferred PS-4400 tapes include PS-4425, PS-4430, and PS-4445 which have tape thicknesses of 0.025, 0.030. 0.045 inches, respectively.

In general, the products of this invention constitute a semi-rigid thermoplastic resinous sheet having a flexible sheet border. The size and shape of the enclosed semi-rigid sheet, as well as the size and shape of the enveloping flexible sheet border, may be widely varied. Additionally, multiple semi-rigid sheets may be enclosed within a single flexible sheet border.

Typically, the flexible sheet also has one or more fasteners for connection to structural elements, such as awnings or frames. Alternatively, the fasteners may facilitate joining one flexible sheet containing a semi-rigid sheet to another. Suitable fasteners are well known in the art and include zippers, grommets and pins.

Figure 7:
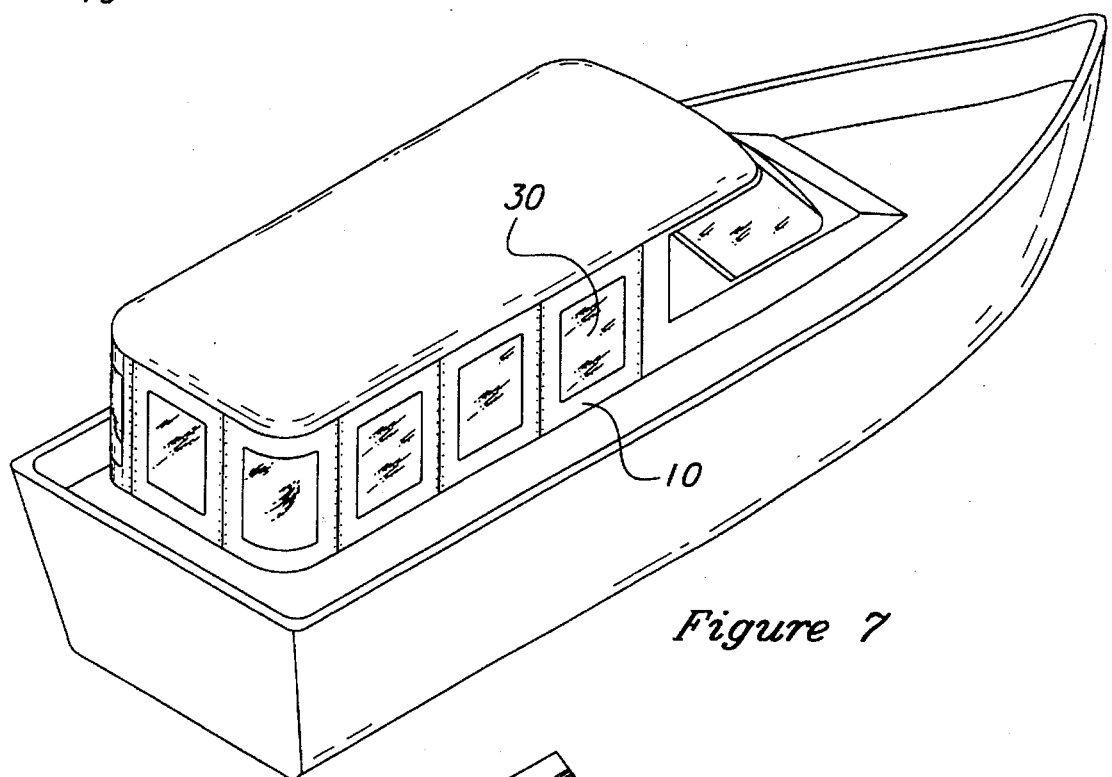
FIG. 7 illustrates a representative product of this invention for use as an enclose for a marine vessel.
Figure 8:
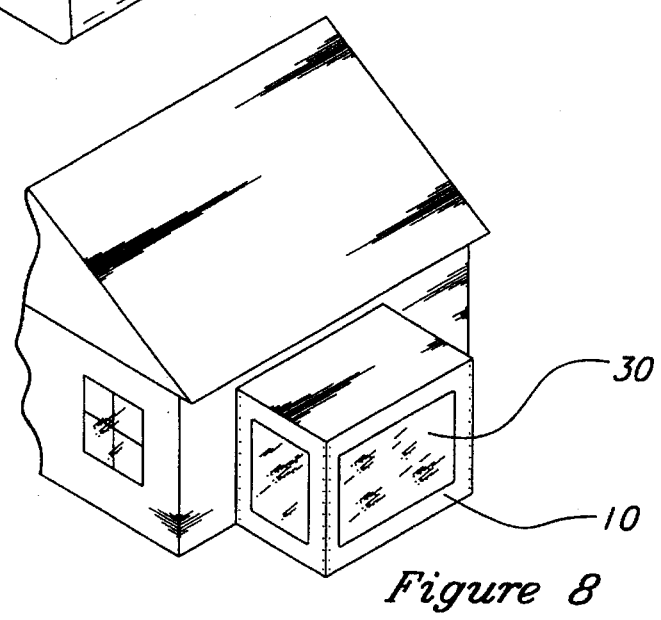
FIG. 8 illustrates a further representative product of this invention for use as an enclosure for a porch.

The products of this invention may be used as awnings or enclosures for buildings, as well as for convertible enclosures for marine vessels. Representative embodiments of the products of this invention are shown in FIGS. 5, 7 and 8. FIG. 5 illustrates a representative product of this invention with flexible fibrous sheet border 10, semi-rigid thermoplastic resinous sheet 30 and stitching 54, and having suitable fasteners such as snap 50 and zipper 52. FIG. 6 presents a cross-sectional view of the product of FIG. 5, depicting flexible fibrous sheet 10, thermosetting resin 20, adhesive 40, semi-rigid thermoplastic resinous sheet 30 and stitching 54. FIGS. 7 and 8 illustrate use of the product of this invention as an enclosure for a marine vessel and a porch, respectively. In addition, FIG. 7 also illustrates application of the product of this invention to form a curved corner window 70. In this embodiment, the semi-rigid thermosetting resinous sheet is heated and then bent to yield a curved window. In this manner, products of the present invention may be used as planar or sheet windows, as well as curved or bent windows.

The following examples are provided for purposes of illustration, not limitation.

EXAMPLES

Example 1

Method for Abrading Semi-Rigid Thermoplastic Resinous Sheets

In this example, the method for abrading the front and back edge surfaces of Lexan XL, a semi-rigid thermoplastic resinous sheet, is described.

Sheets of Lexan XL are sold with a protective covering removably affixed to both front and back surfaces to prevent scratching. These sheets (with protective covering in place) are first cut to size with a saw. The protective covering over the portion of the sheet to be abraded is then removed by scoring an appropriate distance in from the edge of the sheet, and peeling off the protective covering around the perimeter on both the front and back surfaces of the sheet.

The Lexan XL sheet is abraded by passing the sheet between counter-rotating grinding wheels which are one-inch in height, thus creating an abraded edge surface on both sides of the sheet extending one inch along the entire perimeter of the sheet's edge. A suitable abrading device is depicted schematically in FIG. 3. The depth of the abrasion is controlled by the distance separating the counter-rotating grinding wheels, and is set to remove about one-thirty second ($1/32$") of an inch on both sides of the Lexan XL sheet (see FIG. 4A). After abrading, the abraded end of the sheet is smoothed or rounded (see FIG. 4B) by contact with a router having a bullnose router bit.

Abraded Lexan XL sheets prepared by the above method are suitable for adhesion to flexible fibrous sheets as described below.

Example 2

Method for Adhering a Flexible Fibrous Sheet to a Semi-Rigid Thermoplastic Resinous Sheet In this example, a method for adhering a flexible fibrous sheet (i.e., Sunbrella) to an abraded semi-rigid thermoplastic resinous sheet (i.e., Lexan XL) is described.

Sunbrella of the size desired for the protective covering is cut with a hot knife. Once cut to size, the Lexan XL sheet prepared in Example 1 above is traced upon the Sunbrella sheet at the desired window location.

The Lexan XL sheet is prepared for adhesion by creating an adhesive surface. The adhesive surface is made by applying VHB 4949 (3M, St. Paul, Minn.), a double-sided acrylic foam tape, to all abraded surfaces of the Lexan XL sheet. The Lexan XL sheet with adhesive surface prepared in this manner is suitable for adhering to the unified surface of Sunbrella as described below.

The Sunbrella sheet is prepared for adhesion by creating a unified surface on the sheet's edge surface that overlaps the adhesive surface of the Lexan XL sheet. The unified surface of the Sunbrella is prepared by the application of DP 100 (3M, St. Paul, Minn.), an epoxy resin. The DP 100 resin is applied uniformly over the edge surface of the Sunbrella sheet such that coverage is complete and has a thickness between approximately one-sixty fourth of an inch and one-thirty second of an inch. Once the DP 100 has been applied, the resin is allowed to cure to create the unified surface. Curing typically requires between six and eight hours.

The Sunbrella sheet is then cut with a hot knife along a line extending one inch inside the perimeter of the traced window such that the unified surface of the Sunbrella sheet entirely overlaps the adhesive surface of the Lexan XL sheet. The Sunbrella sheet with the unified surface prepared in this manner is suitable for adhering to the adhesive surface of the Lexan XL sheet as described below.

Adhesion of the Sunbrella sheet to the Lexan XL sheet is achieved by contacting the adhesive surface of the Lexan XL sheet with the unified surface of the Sunbrella sheet. Application of pressure (e.g., a roller) to the overlapped portion of the adhering surfaces assists in adhesion between the two sheets.

This process is then repeated to adhere a second sheet of Sunbrella to the opposite side of the Lexan XL sheet. Once all sheets have been adhered, the Sunbrella sheet may be trimmed to its final dimensions. The two Sunbrella sheets may then be sewn together; a first seam is preferably sewn immediately beyond the Lexan XL sheet, and a second seam may be sewn near the Sunbrella sheet's edge. To facilitate attachment of the Sunbrella sheet to other coverings or to structural supports, suitable fasteners are affixed to the Sunbrella sheet.

A final product prepared by the method described above is illustrated in FIG. 5. The application of the product as a protective covering for a marine vessel and a porch enclosure are illustrated in FIGS. 7 and 8, respectively.

Example 3

Method for Adhering a Flexible Resinous Sheet to a Semi-Rigid Thermoplastic Resinous Sheet In this example, a method for adhering a flexible resinous sheet (i.e., Duracote) to an abraded semi-rigid thermoplastic resinous sheet (i.e., Lexan XL) is described.

Duracote of the size desired for the protective covering is cut with a hot knife. Once cut to size, the Lexan XL sheet prepared in Example 1 above is traced upon the Duracote sheet at the desired window location.

The Lexan XL sheet is prepared for adhesion by creating an adhesive surface. The adhesive surface is made by applying VHB 4945 (3M, St. Paul, Minn.), a double-sided acrylic foam tape, to all abraded surfaces of the Lexan XL sheet. The Lexan XL sheet with adhesive surface prepared in this manner is suitable for adhering to the edge surface of Duracote as described below.

The Duracote sheet is prepared for adhesion by washing the resinous sheet's edge surface with acetone. Washing is accomplished by wiping a light coat of acetone with a cotton cloth along the edge to be contacted with the adhesive.

The Duracote sheet is then cut with a hot knife along a line extending one inch inside the perimeter of the traced window such that the acetone washed edge surface of the Duracote sheet entirely overlaps the adhesive surface of the Lexan XL sheet. The Duracote sheet with the acetone washed edge surface prepared in this manner is suitable for adhering to the adhesive surface of the Lexan XL sheet as described below.

Adhesion of the Duracote sheet to the Lexan XL sheet is achieved by contacting the adhesive surface of the Lexan XL sheet with the acetone washed surface of the Duracoat sheet. Application of pressure (e.g., a roller) to the overlapped portion of the adhering surfaces assists in adhesion between the two sheets.

This process is then repeated to adhere a second sheet of Duracote to the opposite side of the Lexan XL sheet. Once all sheets have been adhered, the Duracote sheet may be trimmed to its final dimensions. The two Duracote sheets may then by sewn together; a first seam is preferably sewn immediately beyond the Lexan XL sheet, and a second seam may be sewn near the Duracote sheet's edge. To facilitate attachment of the Duracote sheet to other coverings or to structural supports, suitable fasteners are affixed to the Duracote sheet.

From the foregoing, it will be appreciated that, although specific embodiments of this invention have been described herein for the purposes of illustration, various modifications may be made without departing from the spirit and scope of the invention. Accordingly, the invention is not limited except by the appended claims.

What is claimed is:

1. A product comprising:
   a semi-rigid thermoplastic resinous sheet having an adhesive adhered on at least a portion of an edge surface of the semi-rigid thermoplastic resinous sheet; and
   a flexible resinous sheet affixed to the adhesive of the semi-rigid thermoplastic resinous sheet.

2. The product of claim 1 wherein a fastener is affixed within the flexible resinous sheet.

3. The product of claim 2 wherein the fastener is a snap or a zipper.

4. The product of claim 1 wherein the edge surface of the semi-rigid thermoplastic resinous sheet is abraded, and the adhesive is adhered to the abraded edge surface of the semi-rigid thermoplastic resinous sheet.

* * * * *